United States Patent [19]
Wanlass

[11] 4,063,135
[45] Dec. 13, 1977

[54] ELECTRIC MOTOR HAVING CONTROLLED MAGNETIC FLUX DENSITY

[75] Inventor: Cravens L. Wanlass, Santa Ana, Calif.

[73] Assignee: Cravens Research Company, Santa Ana, Calif.

[21] Appl. No.: 597,529

[22] Filed: July 21, 1975

[51] Int. Cl.² .............................................. H02P 1/44
[52] U.S. Cl. ............................... 318/220 A; 318/200; 318/227; 318/228
[58] Field of Search ............... 318/200, 220 R, 220 A, 318/221 R, 221 D, 225 R, 227, 230, 138, 222, 228; 310/72, 166

[56] References Cited
U.S. PATENT DOCUMENTS

| | | | |
|---|---|---|---|
| 2,640,956 | 6/1953 | Buchanan | 318/220 R |
| 2,807,765 | 9/1957 | Suhr | 318/220 R |
| 2,995,690 | 8/1961 | Lemon | 318/138 |

*Primary Examiner*—Gene Z. Rubinson
*Attorney, Agent, or Firm*—Lyon & Lyon

[57] ABSTRACT

A motor is disclosed in which the stator winding of, for example, a squirrel cage induction motor, is connected in series with a capacitor so that the capacitor, together with the input voltage, causes the stator core to periodically switch from a nonsaturated to a saturated condition and vice-versa so that the flux density is maintained at a uniform high level. A second stator winding may be provided in parallel with the first stator winding and capacitor which second winding serves to provide increased starting torque and improve the overall operating characteristics of the motor. Also disclosed is an embodiment in which an inverter is employed to permit the motor to be operated from a DC source.

24 Claims, 10 Drawing Figures

Unmodified (1791 RPM)

Modified (1788 RPM)

Total Current

Total Current

Current in Main Winding

Dayton Capacitor Start Motor
Model 5K459B 3/4 H.P. 1725 RPM
Input Voltage 120V
Torque -001 in.lbs. (No Load)

Larger Waveform  - Input Voltage
   Smaller Waveform - Current    (Capacitance After
     Modification = 139 u.f.)

Current in Auxiliary Winding

FIG. 5

Unmodified (1763 RPM)

Total Current

Modified (1755 RPM)

Total Current

Current in Main Winding

Dayton Capacitor Start Motor
Model 5K459B 3/4 H.P. 1725 RPM
Input Voltage 120V
Torque -013 in.lbs. ( .36 H.P. )

Larger Waveform   - Input Voltage
  Smaller Waveform  - Current

(Capacitance After
    Modification = 139 u.f.)

FIG. 6

Current in Auxiliary Winding

Unmodified (1721 RPM)

Total Current

Modified (1692 RPM)

Total Current

Current in Main Winding

Dayton Capacitor Start Motor
Model 5K459B  3/4 H.P.  1725 RPM
Input Voltage 120V
Torque -027 in.lbs. (.73 H.P.)

Larger Waveform  - Input Voltage
  Smaller Waveform - Current

(Capacitance After
  Modification = 139 u.f.)

FIG. 7

Current in Auxiliary Winding

Unmodified (1701 RPM)

Total Current

Modified (1650 RPM)

Total Current

Current in Main Winding

Dayton Capacitor Start Motor
Model 5K459B 3/4 H.P. 1725 RPM
Input Voltage 120V
Torque -032 in.lbs. (.84 H.P.)

Larger Waveform - Input Voltage
Smaller Waveform - Current

(Capacitance After
 Modification = 139 u.f.)

Current in Auxiliary Winding

FIG. 8

Voltage Waveforms
Sine Wave - Input Voltage - Irregular Wave - Main Winding Voltage

Torque -001 in.lbs.
RPM 1788

Torque -013 in.lbs.
RPM 1754

Torque -027 in.lbs
RPM 1685

Torque -032 in.lbs.
RPM 1632

FIG. 9

Current (Larger Waveform) in Main
Winding When no Auxiliary Winding Connected

Modified:
(c = 46 u.f.)

Dayton Capacitor
  Start Motor

Model 5K459B
3/4 H.P. 1725 RPM
Input Voltage - 220V

Torque -022 in.lbs.
RPM 1746

FIG. 10

ELECTRIC MOTOR HAVING CONTROLLED MAGNETIC FLUX DENSITY

BACKGROUND OF THE INVENTION

Present day induction motors such as the squirrel cage type have numerous limitations. For example, when heavily loaded, they draw excessive currents as the rotor slows down, which currents can result in motor burn out unless the motor is protected by auxiliary equipment. Such motors must have a high breakaway torque to running torque ratio to prevent motor damage in the event of motor overload, and as a result the flux density must be maintained at considerably less than saturation levels. This relatively low flux density during normal operation is also necessitated by potential input voltage variations. Because the flux density must be kept relatively low, the motor size must be substantially larger than would theoretically be necessary in an ideal motor in order to obtain the desired output horsepower. In addition, the output horsepower available from such motors is significantly dependent on the line voltage, and to some extent, line frequency. Another problem encountered in conventional induction motors is the high starting currents inherent in their operation. Ordinarily, in motors of any size, external current limiting devices must be used, or special and expensive rotor designs employed.

SUMMARY OF THE INVENTION

The present invention overcomes or reduces the foregoing disadvantages of conventional electric motors by providing a system in which the magnetic flux density in the stator is maintained at a maximum level. In addition, the system permits the current in the rotor also to be maintained at a large magnitude relative to those permitted in conventional electric motors of the induction type. Since the force generated in a conductor is defined by the equation:

$$F = BlI$$

where
  $F$ = force where
  $B$ = flux density where
  $l$ = length of the conductor, where
  $I$ = current in the conductor it can be seen that maximizing the terms B and I for a given l maximizes the force and consequently the torque and horsepower of a motor.

According to the present invention, flux density is maximized by controlling the flux density in the stator core by means of a capacitor coupled in series with the main stator winding, the capacitor having a value such that the voltage stored therein will, in combination with the input voltage, periodically cause the volt-second capacity of the stator core to be exceeded with the result that the core will periodically change non-linearly from a non-saturated to a saturated condition and back again. The average flux density in the stator core is thus maintained quite high without the danger of high input voltages resulting in extremely high input currents. The capacitor limits the amount of energy that can be transferred to the rotor even if the rotor has a very low impedance so rotor current can also be maximized. The rotor inductance can be made lower than in a conventional motor and the current induced at zero motor speed can be made greater than is conventional, yet this current will still have a proper value at normal motor operating speeds and normal loads. Thus, the motor of the present invention can be optimized much better than conventional motors for a large number of applications or for any given application.

By using a capacitor in series with the motor stator winding and operating the motor magnetic path in soft saturation due to the limiting effect of total energy transfer of the capacitor, the end result is a motor that can be operated at maximum flux density under most conditions of line voltage without resulting in extremely high input currents for high input voltages. In other words, the input current and flux density in the device would not be extremely non-linear as a function of the line voltage as is presently the case with conventional AC induction and other motors. The present invention makes use of the fact that the inductances of the motor winding can only absorb so much energy before the magnetic material of the motor stator saturates and discharges the capacitor. When the motor magnetic material saturates, the capacitor discharges through the motor winding and the power line source and charges up the capacitor in the opposite polarity. The current through the winding then reverses and the capacitor is then the source of energy and maintains the current flowing through the winding. This continues until the voltage of the input line changes in polarity. The volt-seconds of the input voltage from the line then adds to the volt-seconds that have been applied by the capacitor to the motor winding. This continues until the total volt-seconds applied to the motor winding exceeds the volt-second capacity of the winding and magnetic material of the motor stator, and then the magnetic material of the motor again saturates. The capacitor then discharges through the motor winding since it has saturated and the line power source charges up the capacitor in the opposite polarity again. The current then reverses once more through the motor winding and the capacitor again provides the source of current through the motor winding. This continues until the line voltage again changes polarity. As the line voltage amplitude continues to increase the volt-second of the line voltage plus that of the capacitor again are in phase and add until the volt-second capacity of the motor winding and its associated magnetic material are exceeded. The winding magnetic material again saturates and the inductance of the motor winding decreases considerably again causing the capacitor to discharge through the winding. This process is repeated each half-cycle and results in the motor running at maximum flux density and thus maximum force, torque and horsepower.

The use of the present invention allows for maximum flux density and since the voltage across the capacitor is usually much higher (although it need not be) than the line voltage, the flux density in the stator core is relatively independent of the line voltage over fairly wide ranges of amplitude. Furthermore, the capacitor prevents excessive currents from passing through the motor winding when the magnetic material saturates since only the energy in the capacitor, i.e., $1/2CV^2$, can be transferred through the winding. This limited energy transfer prevents excessive currents from the line through the motor winding.

The result is an AC motor that will operate over wide ranges of input voltage and operate at high efficiency and possess excellent operating characteristics. Since the capacitor limits the amount of energy transferred through the motor winding each half cycle, motor burn out is not normally possible. In the case of motor overload all that will occur is that the motor will stall and the input power to the motor will be greatly reduced. This is due to the fact that the series capacitor will have a much lower voltage across it than normal since the motor is not operating in the controlled phase, and the $1/2CV^2$ energy level is greatly reduced.

It has been found that even better operating characteristics can be achieved if an auxiliary winding is provided on the stator core, this auxiliary winding being connected in parallel with the main winding and capacitor. It has been found that the auxiliary winding provides the necessary rotating field for starting a single phase motor and in addition provides considerably more starting torque for the motor. It has further been found that once the motor is up to rated speed at rated load, the auxiliary winding plays no appreciable part in the operation of the motor. If, however, the load increases, the auxiliary winding once again draws current, acts as a motor winding, and provides additional torque to the motor. In the event of a substantial overload, the motor will still stall without the damage due to large currents but as soon as the load is removed the motor will again come up to speed. This auxiliary winding is usually much greater in impedance than the main winding and therefore the current through the auxiliary winding is relatively low compared, for example, with the main winding of an induction motor.

Furthermore, the auxiliary winding serves to limit the input current, because as the input voltage increases, or the motor speed increases, this winding begins to act as a generator winding due to the back e.m.f. exceeding the input voltage, and generates a current which counteracts some of the current drawn by the main winding. This, of course, is made possible by the fact that the main winding is the primary source of power to the motor.

RELATED PATENTS

Somewhat similar subject matter is disclosed in my U.S. Pat. Nos. 3,612,988 and 3,881,146, the disclosures of which are incorporated herein by reference.

DESCRIPTION OF THE INVENTION

Figure 1:
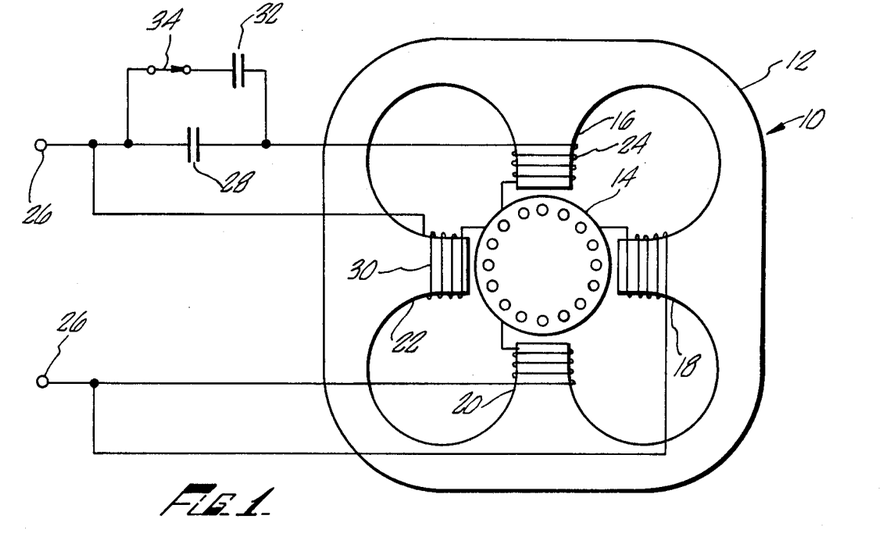
FIG. 1 is a schematic diagram of a preferred embodiment of the present invention.

FIG. 1 illustrates in schematic form the preferred embodiment of the present invention. An AC induction motor of the squirrel cage type is generally indicated at 10 and is diagrammatically shown to have a stator 12 of magnetic material and a squirrel cage rotor 14. The stator is shown as having four pole pieces, 16, 18, 20 and 22 although more or less pole pieces may be used if desired, as will be apparent to those skilled in the art. It will also be apparent to those skilled in the art that the configuration of the pole pieces shown is diagrammatic only. In most applications, it would probably be desirable to provide the pole pieces with a constriction so that saturation would occur at these points only. No attempt is made herein to optimize the physical construction of the motor. The main stator winding 24 is shown as wound on poles 16 and 20 and is connected to input terminals 26 by means of a series capacitor 28. The capacitor 28 need have no particular value, but its capacitance must be large enough to maintain a capacitive power factor in the series circuit comprising this capacitor and the winding 24 during the motor's normal operating mode. An auxiliary winding 30 is wound on pole pieces 18 and 22 and is connected in parallel with winding 24 and capacitor 28. The winding 30 is preferably of considerably higher inductance and impedance than the winding 24. It may, for example, have considerably more turns of finer wire. A starting capacitor 32 is connected across the capacitor 28 by a centrifugal switch 34.

The operation of the motor shown in FIG. 1 is as described above. Briefly, when an AC voltage is applied to the terminals 26, the capacitor 28 begins to charge and a current flows through the winding 24. A current also flows through the winding 30 which is out of phase with the primarily capacitive current in the winding 24 with the result that a rotating field is created which causes the rotor 14 to begin rotating. At this time, a substantial amount of the driving force is produced by the winding 30 inasmuch as the main winding 24 and capacitor 28 has not yet entered into its normal operating mode. As the rotor speed and the back e.m.f. increase, the effective inductance of the winding 24 becomes such that this winding 24, together with the capacitor 28, goes into its operating mode. In other words, the effective volt-second capacity of the winding 24 and its associated magnetic material becomes sufficiently large to permit the operation of the device in the manner described previously, i.e., the capacitor 28 will periodically charge, discharge and recharge in the opposite direction causing the magnetic material associated with the winding 24 to switch from a nonsaturated to a saturated condition while maintaining the average flux density quite large.

As the rotor approaches rated speed, the current in the auxiliary winding 30 becomes less and less. Preferably, this winding is designed to have minimum current at rated speed and load and nominal input voltage. In the event the load should increase or the speed otherwise decrease, the winding 30 will draw more current and again contribute to the driving force of the motor. This is very desirable as it provides additional torque for periods of overload, which overload, if the winding 30 was not present, might cause the capacitor 28 and winding 24 to be driven out of its operating mode and the motor to stall.

The capacitor 32, while not necessary, is helpful for increasing starting torque by initially allowing more current to flow through the main winding 24. After the motor reaches a predetermined speed, the centrifugal switch 34 opens, removing the capacitor 32 from the circuit.

FIGS. 5-10 are reproductions of photographs of oscilloscope traces illustrating typical waveforms present during the operation of the motor of the present invention. They were taken from a Tektronix Dual Bram Oscilloscope Model 502A with which was employed a Tektronix Model P6042 current probe. A Magtrol Model HD-895-6 dynamometer was used to establish torque and RPM values. The motor employed was a Dayton capacitor start motor Model 5K459B rated at three-fourths horse power and 1725 RPM. FIGS. 5, 6, 7 and 8 compare the operation of the motor as originally designed and as modified according to my invention by placing a 139 microfarad capacitor in series with the main stator winding and connecting the auxiliary stator winding in parallel with this series circuit. In both cases, the original starting capacitor was employed during starting and then switched out by a centrifugal switch. The starting capacitor thus had no influence on the waveforms shown. The line voltage was 120 volts.

Figure 5:
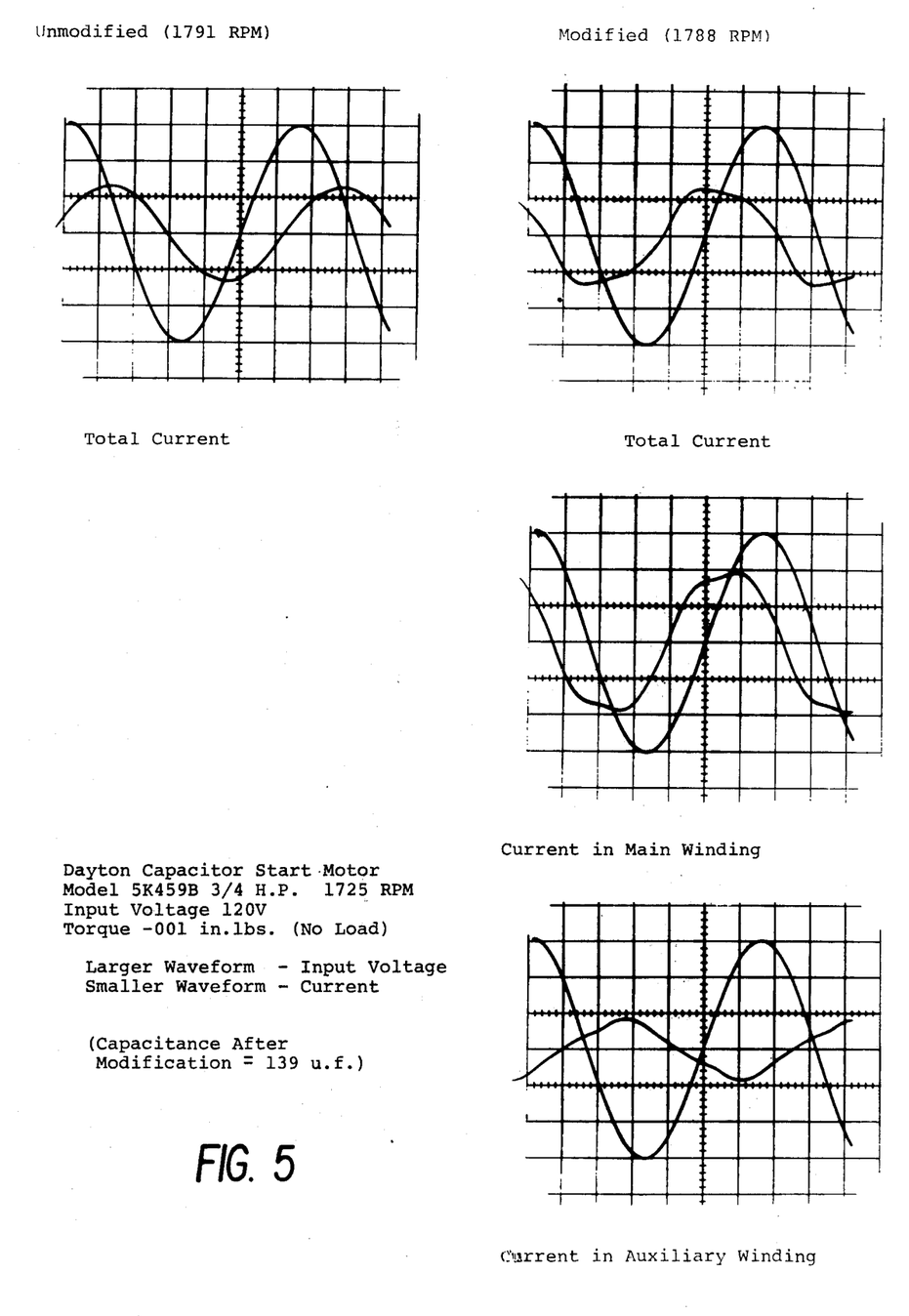
FIGS. 5 through 10 are reproductions of photographs of oscilloscope traces illustrating typical waveforms present during operation of the motor of the present invention.
Figure 6:
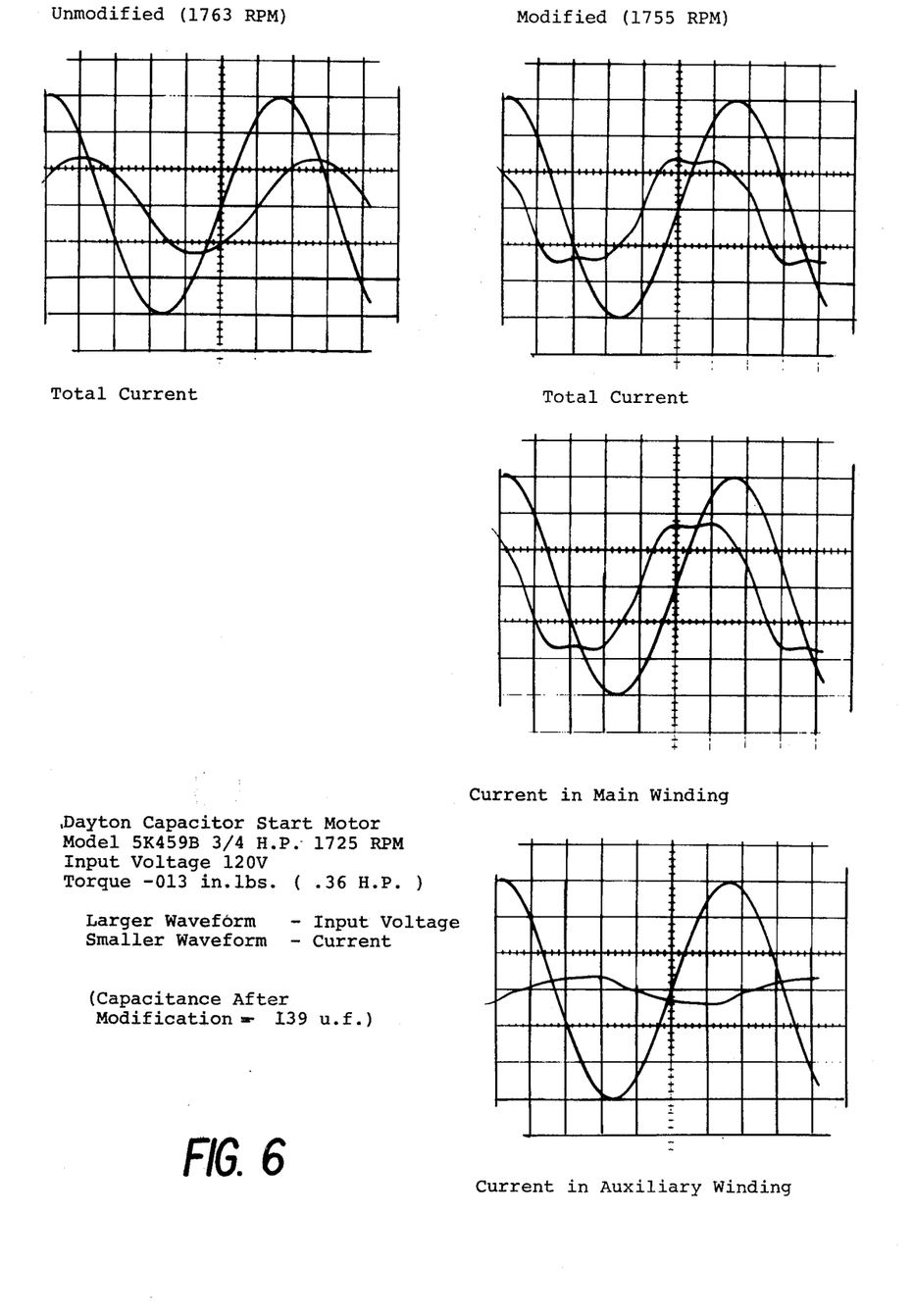

FIGS. 5, 6, 7 and 8 show the line voltage and current waveforms at four different operating conditions — no load, approximately half-load, approximately full load, and overload. As can be seen, in each case the current in the unmodified motor is substantially sinusoidal and lags the line voltage. In the modified motor, however, the total current is a modified square wave and is a composite of the currents in the main stator winding and the auxiliary stator winding. The total current now leads the line voltage. At low load, as can be seen in FIGS. 5 and 6, the major component of the auxiliary winding current in 180° out of phase with the main current winding and thus acts as a current generator as described above. As further load is added (FIGS. 7 and 8) the major component of the auxiliary winding current moves into phase with the main winding current and, as described, contributes to the driving force of the motor.

Figure 7:
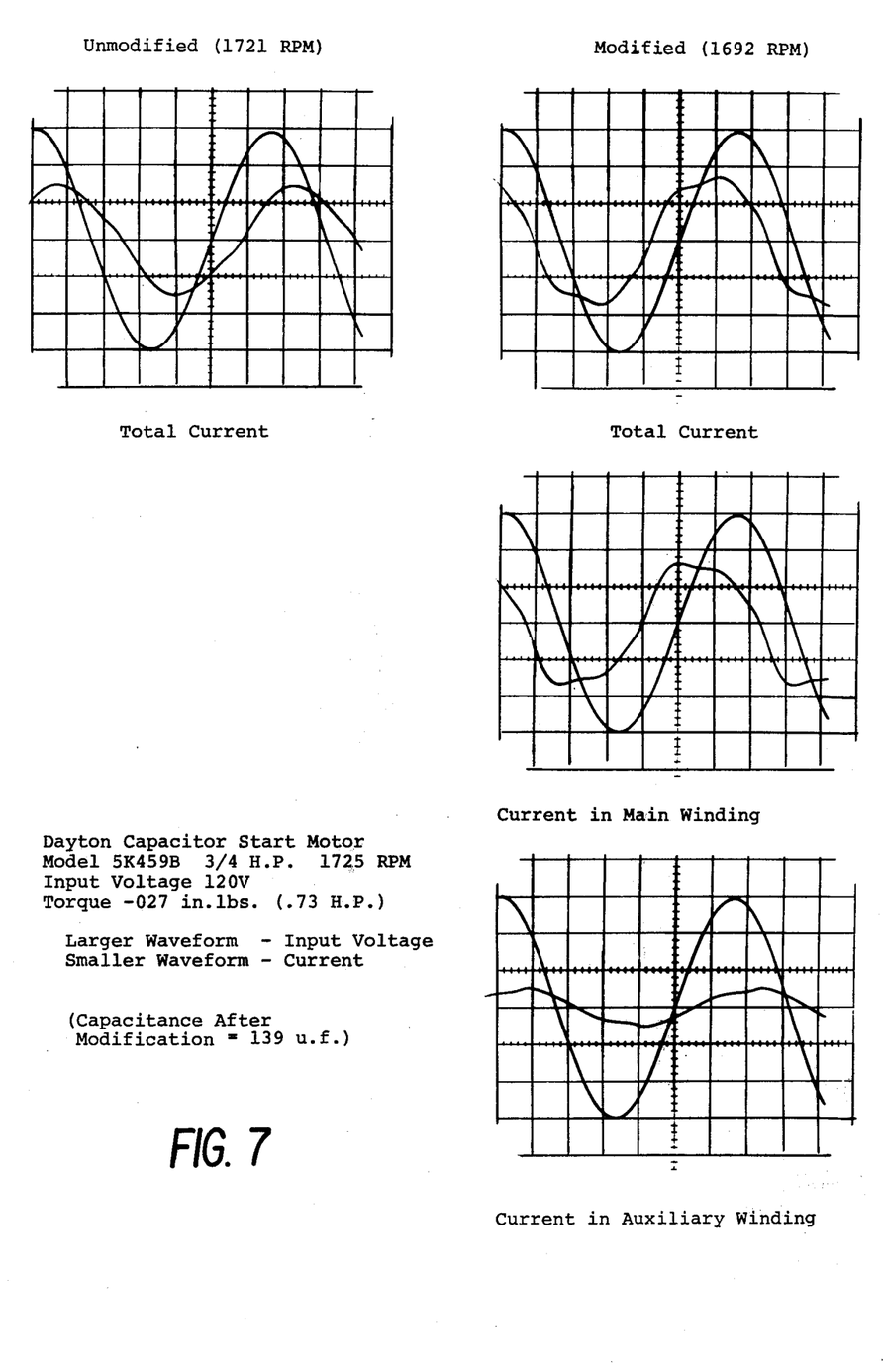
Figure 8:
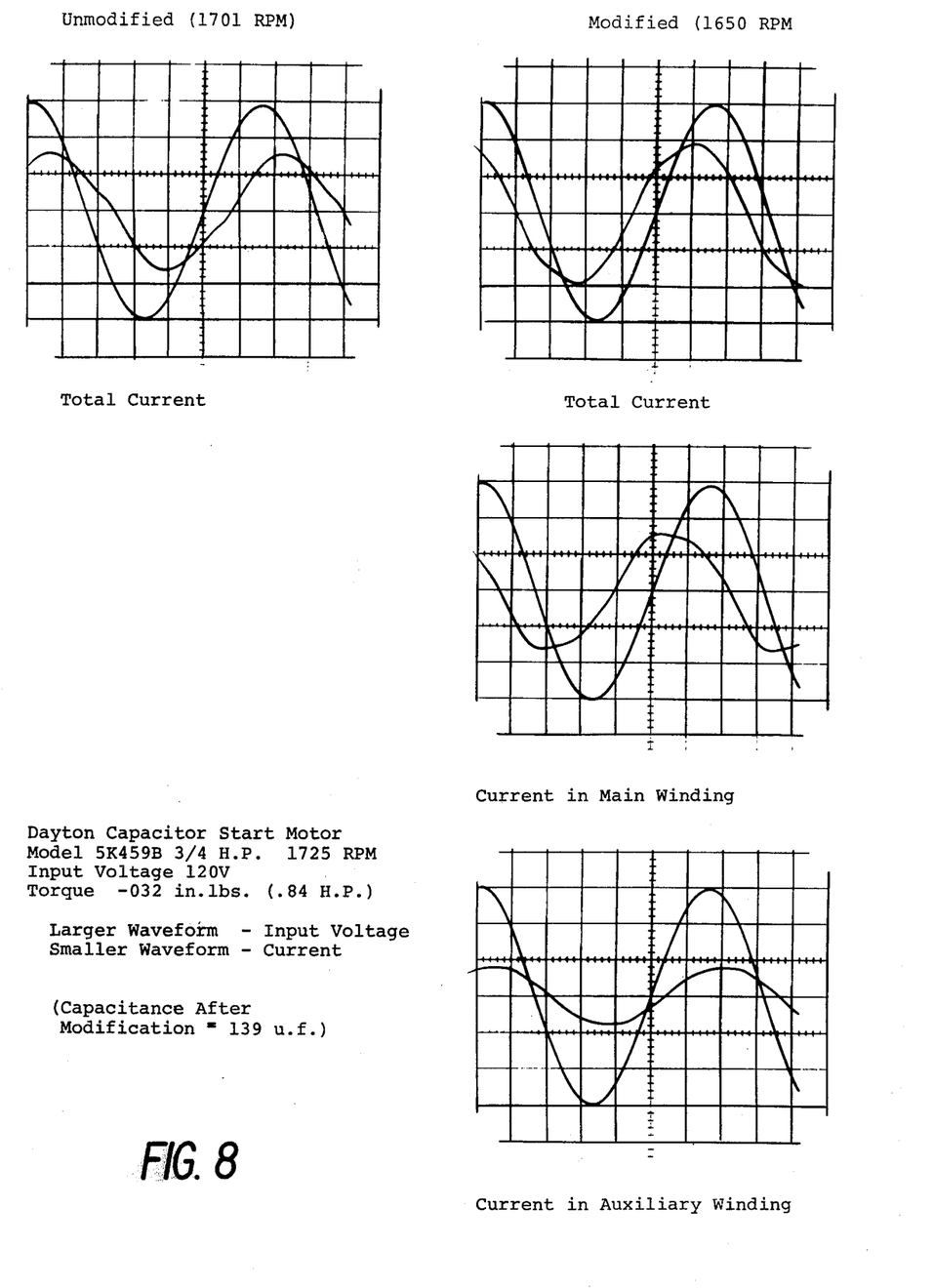
Figure 9:
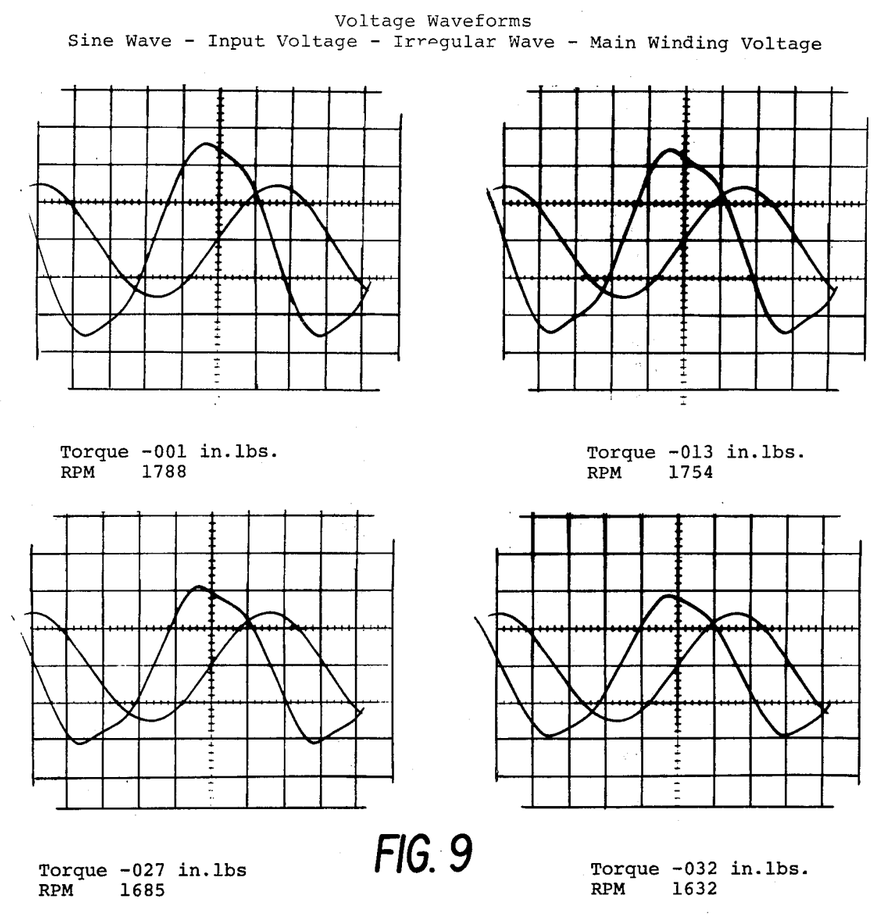

FIG. 9 illustrates the line voltage and the voltage across the main stator winding of the modified motor at the same four conditions. In this test, the line voltage had dropped to 115 volts, but all other conditions remained the same (FIGS. 7 and 8).

Figure 10:
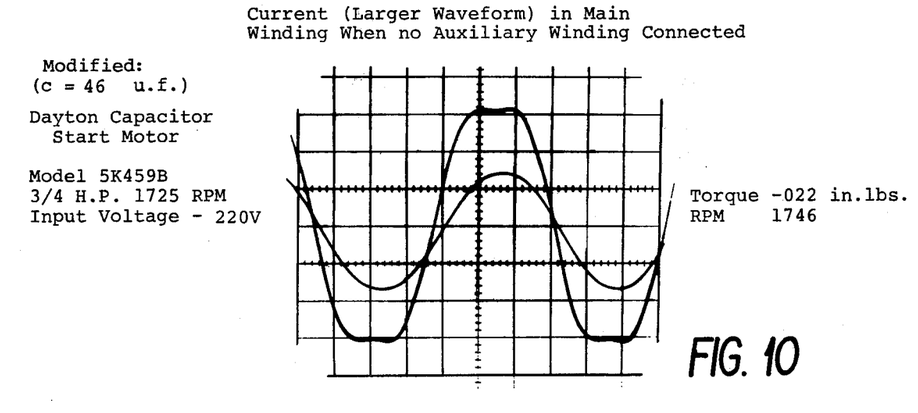

FIG. 10 illustrates the current waveform in the modified motor when the auxiliary winding is disconnected. During this test, the input voltage was 220 volts, and the capacitor in the main stator winding had a value of 46 microfarads.

In converting the motor discussed in the foregoing, no effort was made to optimize the efficiency of the modified motor, but only to show typical waveform relationships. The photographs are only meant to illustrate the waveforms present and the amplitudes shown are not necessarily significant as the current scale of the oscilloscope was chosen in each instance to best illustrate the waveforms and not to show relative magnitudes.

The advantages of the present invention can be seen from the following example. A Dayton squirrel cage induction motor Model 5K989A rated at one-fourth horsepower at 1725 RPM was modified in accordance with the present invention by connecting a 70 microfarad capacitor in series with the main stator winding, the capacitor running at 180 to 190 volts. The start winding was used as the auxiliary winding and was connected directly across the input line, i.e., the centrifugal switch normally employed in the start winding circuit was bypassed. This switch was then used to connect an additional start capacitor of 120 microfarads (the capacitor 32 in FIG. 1) into the circuit. No internal modifications were made to the motor. Before modification, the efficiency of the motor, i.e., power out to power in, at rated load and speed was about 35%; after modification, at the same speed and load, the efficiency was approximately 60%. In addition, because of the larger internal losses of the unmodified motor, operation at higher output power levels which would theoretically produce greater efficiency is not possible for any significant period of time because the motor would overheat and possibly burn out. Because the internal losses of the modified motor are less, the same motor may be operated at considerably higher power output levels with a corresponding increase in efficiency. Thus the modified motor was operated to produce 0.4 horsepower at which level it had an efficiency of about 75% without any overheating. In fact, the power dissipated internally in the modified motor under these conditions was less than that dissipated in the unmodified motor at rated conditions.

In the unmodified motor, at no load, the input current at an input voltage of 120 volts is approximately 6.3 amps, the rated current of the motor. At 140 volts, however, the current rises to over 9.0 amps and rises rapidly with additional input voltage so that motor burn out would occur. The modified motor had a current of about 3.4 amps at 120 volts input, and was approximately the same at 140 volts, the curve being almost flat beyond that point.

The starting torque of the modified motor was somewhat less than the unmodified motor, but was entirely adequate for input voltages greater than 80 volts. This starting torque could be increased by increasing the capacitance of the start capacitor 32. The motor of the present invention is thus unlike a split-phase motor in that it has adequate starting torque at all normal line voltages and for all normal applications, even without additional starting capacitance.

The same Dayton motor was then again modified to substitute a 100 microfarad capacitor for the 70 microfarad capacitor (the capacitor 28), the capacitor again running at about 180 to 190 volts. In this case, motor efficiency was found to be about 51% at rated load and speed, and again the motor could be run at higher output levels without danger of burn out, e.g., at approximately 0.4 horsepower, with an efficiency of about 75%. The input current at 120 volts was about 5.1 amps and rose to about 5.3 amps at 140 volts with the current rise being quite gradual for higher voltages. The starting torque of the motor as modified in this example was still less than the unmodified motor, but was greater than that of the modified motor of example 1.

Figure 2:
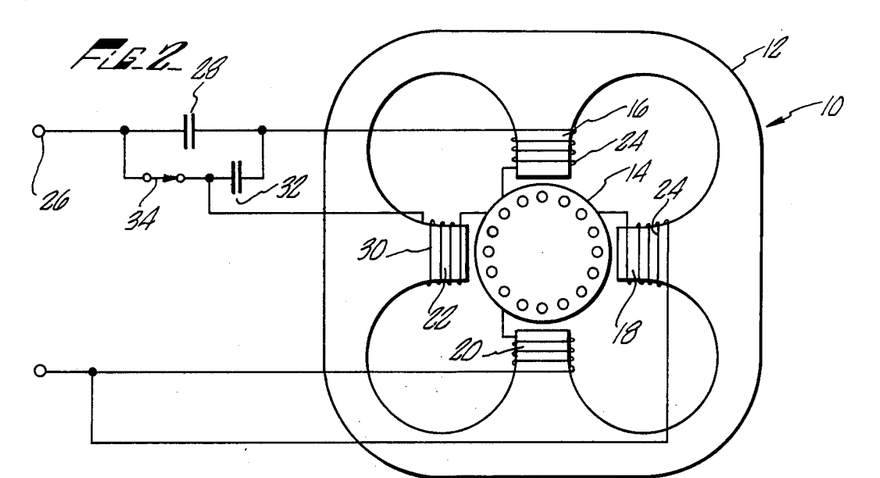
FIG. 2 is a schematic diagram of a modification of the embodiment of FIG. 1.

FIG. 2 shows a modification of the motor of FIG. 1, with the same reference numerals being used for the same elements. As can be seen, the centrifugal switch 34 now acts to remove both the start capacitor 32 and the auxiliary winding 30 from the circuit after the motor gets up to speed. This circuit may be used where it is desirable that the motor stall on overload and not start again until the overload condition is corrected. In such a case, the centrifugal switch 34 may be of the conventional type that will not re-close until the power has been removed. While the start capacitor 32 is not necessary to the operation of the motor, the auxiliary winding 30 must be present in a single phase motor in order that a rotating field can be created to start the motor. Once the motor has gotten up to a speed sufficient to enable the capacitor 28 - winding 24 circuit to go into its operating mode, the winding 30 is no longer necessary to the operation of the motor, although it is generally desirable. While a single phase motor has been illustrated and described, it should be understood that the present invention can equally well be used in connection with three phase or other multi-phase motors with one capacitor being provided per phase. In the case of a multi-phase motor, no starting winding is necessary, but the use of an auxiliary winding would still be beneficial for the reasons stated previously. It appears that only one auxiliary winding would be required to obtain the desired operation, but three such windings, one for each phase, could be used if desired.

Figure 3:
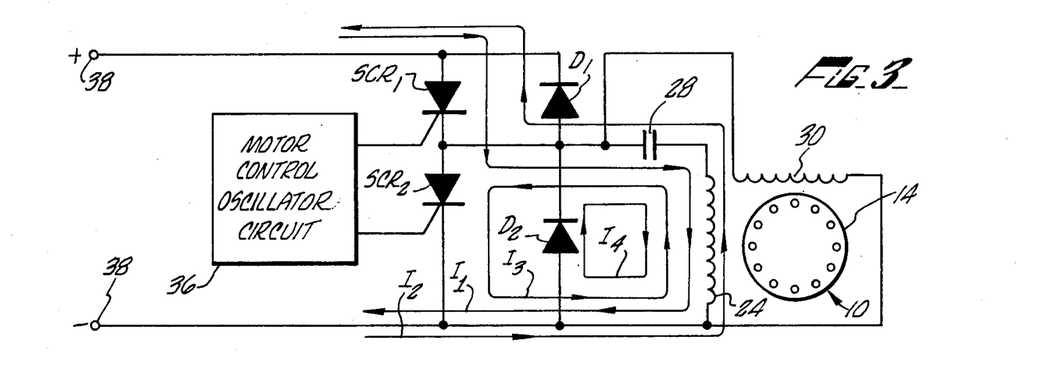
FIG. 3 is a schematic diagram of a second embodiment of the present invention.

FIG. 3 shows an embodiment of the invention that is adapted to be run off a DC voltage source, and which is further adapted to be run at greater speeds and hence greater power to size ratio. In this embodiment, the drawing has been simplified be deleting the stator but it should be understood that it is constructed the same as in FIG. 1.

The start capacitor and centrifugal switch have also been deleted for the sake of simplicity but they would normally be used. Once again the same reference numerals are used to identify the same elements. In addition to the motor itself, there is illustrated an inverter comprising a pair of silicon controlled rectifiers, $SCR_1$ and $SCR_2$, a pair of diodes $D_1$ and $D_2$, and a motor control oscillator circuit 36. The inverter has a pair of input terminals 38 adapted to be connected to a source of DC voltage. The inverter motor circuit illustrated is self-commutated, i.e., the motor control oscillator circuit 36 provides trigger pulses to turn on the SCR's, but the circuit itself turns them off at the proper time. The motor control oscillator circuit 36 is of conventional design and can have a fixed or variable output frequency as desired, as is well known.

The operation of this circuit is as follows. For the sake of simplicity, the current in the winding 30 is disregarded as it does not appreciably affect the operation of the rest of the circuit. $SCR_1$ is triggered into a conductive state by the motor control oscillator circuit 36 which causes current $I_1$ to flow as shown in FIG. 3. In this state, assume the winding 24 is saturated. As capacitor 28 begins to charge up with the positive polarity on the left hand plate, the current through winding 24 decreases until the magnetic material associated with this winding comes out of saturation. At this time, the charge on capacitor 28 is large enough to cause the current through the winding 24 to change direction since this capacitor voltage is greater than the DC source voltage. The current then becomes as shown by $I_2$ in FIG. 3. This reverse current $I_2$ flows through diode $D_1$ and causes $SCR_1$ to turn off. This continues until motor control oscillator circuit 36 causes $SCR_2$ to be triggered on. This results in removing the DC source voltage that was opposing the voltage on the capacitor 24, which has the net result of suddenly adding a voltage equal to that of the source voltage to the voltage previously seen by the winding 24. The total volt-seconds applied across the winding 24 soon exceeds the volt-second capacity of the winding 24 and its associated magnetic material and the latter saturates, causing a reduction in the inductance of the winding 24. The capacitor 28 then discharges through the winding 24, this current being shown in FIG. 3 as $I_3$. The capacitor 28 now begins to charge in the opposite polarity, i.e., the right hand plate becomes positive. When the capacitor 28 charges up in this new and opposite polarity, the current through the winding 24 decreases with the result that it goes out of saturation and into a higher impedance state. The current through the winding 24 then reverses as the right hand plate of capacitor 28 is positive relative to the left hand plate. This current is shown in FIG. 3 as $I_4$. It passes through the diode $D_2$ and causes $SCR_2$ to turn off.

This condition continues until control circuit 36 again triggers $SCR_1$ on. The DC source voltage is now added to the voltage on the capacitor 28 with the result that the volt-second capacity of the winding 24 and its associated magnetic material is exceeded and it again goes into saturation and the current flowing is again $I_1$. The cycle then repeats itself. The result is a self-commutating AC induction motor-inverter running from a source of DC power. As used herein, the term AC voltage is thus intended to include both a normal line voltage and a voltage whose polarity is periodically reversed as by an inverter. The frequency of the voltage applied of the motor would, of course, be determined by the frequency of the output of the control circuit 36. The volt-second capacity of the motor must be such as to permit the range of operating frequencies desired. By varying the output frequency of the control circuit 36, a motor running from a DC power source can be used to power equipment requiring a variable speed without using complicated control circuits or special costly motors. If desired, the frequency of the control circuit 36 can be controlled by a suitable speed responsive feedback network initiated, e.g., by a tachometer. By this method, a constant speed motor may be obtained.

Figure 4:
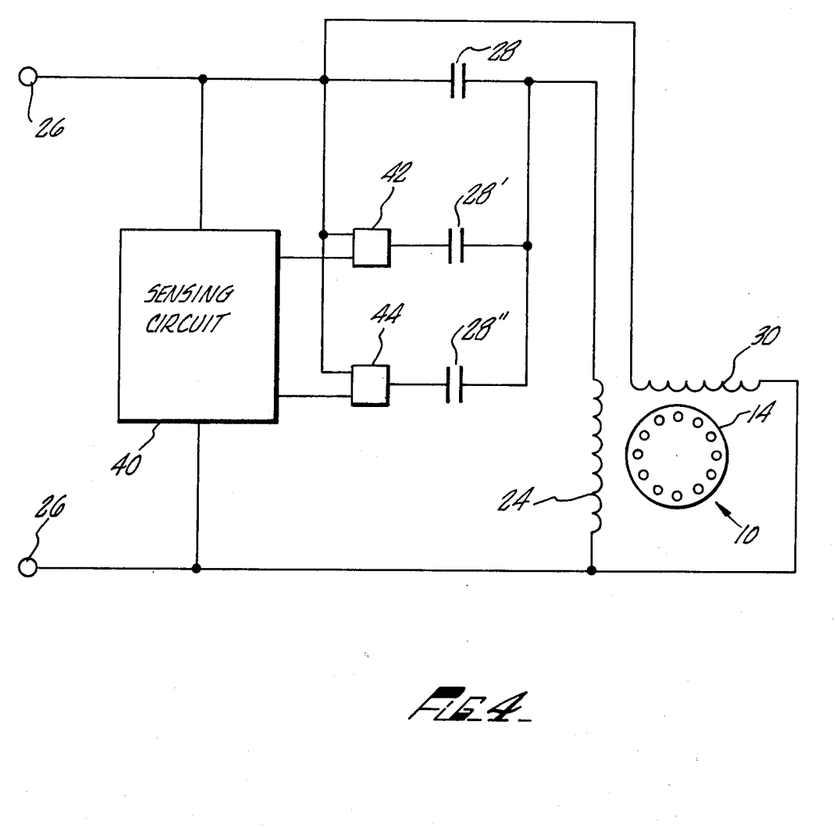
FIG. 4 is a schematic diagram of a third embodiment of the present invention.

Another embodiment of the invention is shown in FIG. 4. This embodiment is the same as FIG. 1, except that a sensing circuit 40 is provided to sense the RMS magnitude of the input AC voltage, and control suitable switching devices such as the TRIACS 42 and 44, each of which can switch an additional capacitor 28' or 28" in parallel with the capacitor 28. This additional circuitry can be used in place of, or in addition to, the start capacitor 32 and switch 34 shown in FIG. 1. The sensing circuit 40 serves to determine the RMS value of the input voltage and control the amount of capacitance to be connected to the motor winding 24. The capacitance required is an inverse function of the input voltage so that the higher the input RMS voltage, the less the amount of capacitance required. The use of TRIAC's permits the capacitance to be switched in or out of the circuit at the zero voltage cross-over point so that no switching transients occur. By this technique, the motor can automatically adjust to any standard line voltage, i.e., from the 90 volts used in Japan to the 260 volts used in Europe. The motor will also allow excellent operation at either 50 or 60 hertz without adjustment.

It should be understood that while the foregoing description of the operation of the motor is believed to best describe the physical phenomena present in its operation, it is not meant in any way to limit the scope of the present invention, and that the operation of the motor may someday be better explained. It should also be understood that while the invention has been described in connection with a squirrel cage induction motor, it is not limited thereto. The foregoing description is thus meant to be illustrative only and not restrictive.

I claim:
1. An electric motor comprising:
 a stator including magnetic material;
 a rotor;

a main stator winding encompassing the magnetic material;

an input adapted to be connected to a source of AC voltage including an inverter;

a capacitor; and means connecting the main stator winding and the capacitor in a series circuit across said input, said capacitor having a capacitance large enough to maintain a non-inductive power factor in said series circuit in the operating mode, and being capable of storing a voltage sufficient, together with a voltage applied to said input, to cause said magnetic material to periodically change from a non-saturated to a saturated condition.

2. The motor of claim 1 wherein said capacitor stores a voltage greater than the nominal value of said AC voltage.

3. The motor of claim 1 wherein said capacitor stores a voltage at least 50% greater than the nominal value of said AC voltage.

4. The motor of claim 1, wherein said inverter includes switching means which are triggered on by an external source of signals and turned off by operation of said capacitor and main stator winding.

5. An electric motor comprising:

a stator including magnetic material;

a rotor;

a main stator winding of relatively low inductance encompassing the magnetic material;

an auxiliary stator winding of relatively higher inductance encompassing the magnetic material;

an input adapted to be connected to a source of AC voltage;

a capacitor;

means connecting the capacitor and the main stator winding in a series circuit across the input, said capacitor having a capacitance large enough to maintain a capacitive power factor in said series circuit in the operating mode, and being capable of storing a voltage sufficient, together with a voltage applied to said input, to cause said magnetic material to periodically change from a non-saturated to a saturated condition; and means connecting the auxiliary winding in parallel with said series circuit.

6. An electric motor comprising:

a stator including magnetic material;

a rotor;

a main stator winding of relatively low inductance encompassing the magnetic material;

an auxiliary stator winding of relatively higher inductance encompassing the magnetic material;

an input adapted to be connected to a source AC voltage;

a capacitor;

means connecting the capacitor and the main stator winding in a series circuit across the input, said capacitor having a capacitance large enough to maintain a capacitive power factor in said series circuit in the operating mode, and being capable of storing a voltage sufficient, together with a voltage applied to said input, to cause said magnetic material to periodically change from a non-saturated to a saturated condition;

means connecting the auxiliary winding in parallel with said series circuit; and speed responsive means for disconnecting said auxiliary winding when said rotor attains a preselected speed.

7. An electric motor comprising:

a stator including magnetic material;

a rotor;

a main stator winding of relatively low inductance encompassing the magnetic material;

an auxiliary stator winding of relatively higher inductance encompassing the magnetic material;

an input adapted to be connected to a source of AC voltage;

a capacitor;

means connecting the capacitor and the main stator winding in a series circuit across the input, said capacitor having a capacitance large enough to maintain a capacitive power factor in said series circuit in the operating mode, and being capable of storing a voltage sufficient, together with a voltage applied to said input, to cause said magnetic material to periodically change from a non-saturated to a saturated condition;

means connecting the auxiliary winding in parallel with said series circuit;

further capacitive means and switching means operable to connect or disconnect said further capacitive means in parallel with said capacitor.

8. An electric motor comprising:

a stator including magnetic material;

a rotor;

a main stator winding of relatively low inductance encompassing the magnetic material;

an auxiliary stator winding of relatively higher inductance encompassing the magnetic material;

an input adapted to be connected to a source of AC voltage;

a capacitor;

means connecting the capacitor and the main stator winding in a series circuit across the input, said capacitor having a capacitance large enough to maintain a capacitive power factor in said series circuit in the operating mode, and being capable of storing a voltage sufficient, together with a voltage applied to said input, to cause said magnetic material to periodically change from a non-saturated to a saturated condition;

further capacitive means; and switching means operable in response to rotor speed to connect or disconnect said further capacitive means in parallel with said capacitor.

9. An electric motor comprising:

a stator including magnetic material;

a rotor;

a main stator winding of relatively low inductance encompassing the magnetic material;

an auxiliary stator winding of relatively higher inductance encompassing the magnetic material;

an input adapted to be connected to a source of AC voltage;

a capacitor;

means connecting the capacitor and the main stator winding in a series circuit across the input, said capacitor having a capacitance large enough to maintain a capacitive power factor in said series circuit in the operating mode, and being capable of storing a voltage sufficient, together with a voltage applied to said input, to cause said magnetic material to periodically change from a non-saturated to a saturated condition;

means connecting the auxiliary winding in parallel with said series circuit;

further capacitive means; and switching means operable in response to the RMS value of the input voltage to connect or disconnect said further capacitive means in parallel with said capacitor.

10. An electric motor comprising:

a stator including magnetic material;

a rotor;

a main stator winding of relatively low inductance encompassing the magnetic material;

an auxiliary stator winding of relatively higher inductance encompassing the magnetic material;

input circuit means including an inverter;

a capacitor;

means connecting the capacitor and the main stator winding in a series circuit across the input circuit means, said capacitor having a capacitance large enough to maintain a capacitive power factor in said series circuit in the operating mode, and being capable of storing a voltage sufficient, together with a voltage applied to said input, to cause said magnetic material to periodically change from a non-saturated to a saturated condition; and means connecting the auxiliary winding in parallel with said series circuit.

11. An electric motor comprising:

a stator including magnetic material;

a rotor;

a main stator winding of relatively low inductance encompassing the magnetic material;

an auxiliary stator winding of relatively higher inductance encompassing the magnetic material;

input circuit means including an inverter;

a capacitor;

means connecting the capacitor and the main stator winding in a series circuit across the input circuit means, said capacitor having a capacitance large enough to maintain a capacitive power factor in said series circuit in the operating mode, and being capable of storing a voltage sufficient, together with a voltage applied to said input, to cause said magnetic material to periodically change from a non-saturated to a saturated condition;

said inverter including switching means which are triggered on by an external source of signals and turned off by operation of said capacitor and main stator winding; and means connecting the auxiliary winding in parallel with said series circuit.

12. An electrical circuit for energizing an alternating current electric motor having a stator including a magnetic core, a stator winding wound on the core of said stator, and a rotor, comprising:

an input adapted to be connected to a source of AC voltage;

means capacitor;

means connecting said capacitor means and said stator winding in series across said input;

said capacitor means being capable of being charged to a voltage sufficient, when added to said AC voltage, to develop a volt-second value across said stator core greater than the volt-second capacity of said core so that said core will be driven into saturation in opposite directions on each half-cycle of said AC voltage;

a second winding wound on said stator core; and means for connecting said second winding in parallel with the series connected stator winding and capacitor means.

13. An electrical circuit for energizing an alternating current electric motor having a stator including a magnetic core, a stator winding wound on the core of said stator, and a rotor, comprising:

an input adapted to be connected to a source of AC voltage;

means capacitor;

means connecting said capacitor means and said stator winding in series across said input;

said capacitor means being capable of being charged to a voltage sufficient, when added to said AC voltage, to develop a volt-second value across said stator core greater than the volt-second capacity of said core so that said core will be driven into saturation in opposite directions on each half-cycle of said AC voltage;

a second winding wound on said stator core, said second winding having a higher inductance than said first winding; and means for connecting said second winding in parallel with the series connected means stator winding and capacitor.

14. An electric motor comprising:

a stator core including magnetic material;

a rotor;

a main stator winding encompassing the magnetic material;

an input adapted to be connected to a source of AC voltage;

means capacitor;

means connecting the main stator winding and the capacitor means in a series circuit across said input;

said capacitor means being large enough to maintain a capacitive power factor in said series circuit in the operating mode and being capable of being charged to a voltage sufficient, when added to said AC voltage, to develop a volt-second value across said stator core greater than the volt-second capacity of said core so that said core will be driven into saturation in opposite directions on each half-cycle of said AC voltage.

15. An electric motor comprising:

a stator core including magnetic material;

a rotor;

a main stator winding encompassing the magnetic material;

an input adapted to be connected to a source of AC voltage;

means capacitor;

means connecting the main stator winding and the capacitor means in a series circuit across said input;

the capacitance of said capacitor means being large enough to maintain a capacitive power factor in said series circuit in the operating mode and being capable of being charged to a voltage sufficient, when added to said AC voltage, to develop a volt-second value across said stator core greater than the volt-second capacity of said core so that said core will be driven into saturation in opposite directions on each half-cycle of said AC voltage; and an auxiliary stator winding encompassing the magnetic material, said auxiliary stator winding being connected in parallel with the series connected main stator winding and capacitor means.

16. The motor of claim 15 wherein the auxiliary winding has a higher inductance than said main stator winding.

17. An electric motor comprising:
a stator including magnetic material;
a rotor;
a main stator winding encompassing the magnetic material;
an auxiliary stator winding encompassing the magnetic material;
an input adapted to be connected to a source of AC voltage;
a capacitor;
means connecting the capacitor and the main stator winding in a series circuit across the input, said capacitor having a capacitance large enough to maintain a non-inductive power factor in said series circuit in the operating mode, and being capable of storing a voltage sufficient, together with a voltage applied to said input, to cause said magnetic material to periodically change from a non-saturated to a saturated condition; and
means adapted to connect the auxiliary winding in parallel with said series circuit.

18. An electric motor comprising:
a stator core including magnetic material;
a rotor;
a main stator winding encompassing the magnetic material;
an auxiliary stator winding encompassing the magnetic material;
an input adapted to be connected to a source of AC voltage;
a capacitor;
means connecting the capacitor and the main stator winding in a series circuit across the input, said capacitor having a capacitance large enough to maintain a non-inductive power factor in said series circuit in the operating mode and being capable of being charged to a voltage sufficient, when added to said AC voltage, to develop a volt-second value across said stator core greater than the volt-second capacity of said core so that said core will be driven into saturation in opposite directions on each half-cycle of said AC voltage; and
means adapted to connect the auxiliary winding to a source of AC voltage.

19. An electrical circuit for energizing an alternating current electric motor having a stator including a magnetic core, a stator winding wound on the core of said stator, and a rotor, comprising:
an input adapted to be connected to a source of AC voltage;
capacitor means;
means connecting said capacitor means and said stator winding in series across said input;
said capacitor being capable of being charged to a voltage sufficient, when added to said AC voltage, to develop a volt-second value across said stator core greater than the volt-second capacity of said core so that said core will be driven into saturation in opposite directions on each half-cycle of said AC voltage.

20. The circuit of claim 19 wherein said source of AC voltage includes an inverter.

21. An electric motor comprising:
a stator comprising a core including magnetic material and main and auxiliary stator windings would on said core and encompassing said magnetic material;
a rotor;
a capacitor;
an input adapted to be connected to a source of AC voltage;
means connecting the capacitor and the main stator winding in series across said input and said auxiliary winding in parallel with said series circuit;
said capacitor being capable of being charged to a voltage sufficient, when added to an AC voltage applied to said input, to develop a volt-second value across said magnetic material greater than the volt-second capacity of said magnetic material so that said magnetic material will be driven into saturation in opposite directions on each half-cycle of said AC voltage; and
said stator windings being arranged and dimensioned such that, upon application of an AC voltage to said input, energy is primarily transferred to said rotor through said auxiliary winding until the back e.m.f. of said motor increases to a point where the volt-second capacity of said magnetic material is sufficiently large to permit primary energy transfer to said rotor through said main winding.

22. The motor of claim 21 wherein means are provided for disconnecting said auxiliary winding after the back e.m.f. of the motor increases to the point where the volt-second capacity of said magnetic material is sufficiently large to permit primary energy transfer to said rotor through said main winding.

23. An electric motor comprising:
a stator comprising a core including magnetic material and main and auxiliary stator windings wound on said core and encompassing said magnetic material;
a rotor;
a capacitor;
an input adapted to be connected to a source of AC voltage;
means connecting the capacitor and the main stator winding in series across said input and said auxiliary winding in parallel with said series circuit;
said capacitor having a capacitance large enough to maintain a capacitive power factor in said series circuit in the operating mode and being capable of being charged to a voltage sufficient, when added to said AC voltage, to develop a volt-second value across said magnetic material greater than the volt-second capacity of said magnetic material so that the said magnetic material will be driven into saturation in opposite directions on each half-cycle of said AC voltage; and
said auxiliary winding having a higher inductance than said main winding so that, upon application of an AC voltage to said input, energy is primarily transferred to said rotor through said auxiliary winding until the back e.m.f. of said motor increases to a point where the volt-second capacity of said magnetic material is sufficiently large to permit primary energy transfer to said rotor through said main winding.

24. The motor of claim 23 wherein means are provided for disconnecting said auxiliary winding after the back e.m.f. of the motor increases to the point where the volt-second capacity of said magnetic material is sufficiently large to permit primary energy transfer to said rotor through said main winding.

* * * * *

UNITED STATES PATENT AND TRADEMARK OFFICE
CERTIFICATE OF CORRECTION

PATENT NO. : 4,063,135
DATED : December 13, 1977
INVENTOR(S) : Cravens L. Wanlass It is certified that error appears in the above-identified patent and that said Letters Patent are hereby corrected as shown below:

| | |
|---|---|
| Column 5, Line 5: | Delete "Bram" and insert "Beam". |
| Column 5, Line 10: | Delete "horse power" and insert "horsepower". |
| Column 5, Line 13: | Delete "139" and insert "139" but not in bold print. |
| Column 5, Line 32: | Delete "in" and insert "is". |
| Column 5, Line 46: | Delete "46" and insert "46" but not in bold print. |
| Column 7, Line 18: | Delete "be" and insert "by". |
| Column 7, Line 57: | Delete "24" and insert "28". |
| Column 13, Line 68, Claim 21: | Delete "would" and insert "wound". |
| Column 13, Line 57, Claim 19: | delete "said capacitor being capable" and insert "said capacitor means being capable". |
| Column 11, Line 61, Claim 12: | delete "means capacitor" and insert "capacitor means". |
| Column 12, Line 36, Claim 14: | delete "means capacitor" and insert "capacitor means". |

UNITED STATES PATENT AND TRADEMARK OFFICE
CERTIFICATE OF CORRECTION

PATENT NO. : 4,063,135
DATED : December 13, 1977
INVENTOR(S) : Cravens L. Wanlass It is certified that error appears in the above-identified patent and that said Letters Patent are hereby corrected as shown below:

Column 12, Line 55, Claim 15: Delete "means capacitor" and insert "capacitor means".

Column 12, Line 13, Claim 13: Delete "means capacitor" and insert "capacitor means".

Column 12, Lines 27 and 38 - Claim 13: Delete "connected means stator winding and capacitor" and insert "connected stator winding and capacitor means "

Column 9, Line 15, Claim 2: Delete "claim 1" and insert "claim 17".

Column 9, line 18, Claim 3: Delete "claim 1" and insert "claim 17".

UNITED STATES PATENT OFFICE
CERTIFICATE OF CORRECTION

Patent No. 4,063,135  Dated December 13, 1977

Inventor(s) Cravens L. Wanlass

It is certified that error appears in the above-identified patent and that said Letters Patent are hereby corrected as shown below:

The drawing figure on the title page should be deleted to appear as shown below:

Figures 1 and 2 of the drawings should be deleted to appear as shown on the attached sheets.

Signed and Sealed this

Tenth Day of April 1979

[SEAL]

Attest:

RUTH C. MASON
*Attesting Officer*

DONALD W. BANNER
*Commissioner of Patents and Trademarks*

FIG. 1.

FIG. 2.